(12) United States Patent
Wagoner et al.

(10) Patent No.: US 7,405,496 B2
(45) Date of Patent: Jul. 29, 2008

(54) TRANSFER CIRCUIT TOPOLOGY FOR REDUNDANT POWER GENERATOR REGULATORS AND INVERTING DC DRIVES

(75) Inventors: Robert Gregory Wagoner, Roanoke, VA (US); Scott Charles Frame, Schenectady, NY (US); Brian Eric Lindholm, Salem, VA (US); Pedro Monclova, Salem, VA (US)

(73) Assignee: General Electric Company, Schenectady, NY (US)

( * ) Notice: Subject to any disclaimer, the term of this patent is extended or adjusted under 35 U.S.C. 154(b) by 489 days.

(21) Appl. No.: 10/766,603

(22) Filed: Jan. 27, 2004

(65) Prior Publication Data

US 2005/0162877 A1 Jul. 28, 2005

(51) Int. Cl.
*H02J 1/00* (2006.01)
(52) U.S. Cl. .......................................... 307/82; 307/85
(58) Field of Classification Search ............... 307/82, 307/70, 85, 66; 363/34, 37, 41; 361/66, 361/91.1
See application file for complete search history.

(56) References Cited

U.S. PATENT DOCUMENTS

| 5,353,665 | A | * | 10/1994 | Heebner | 81/3.2 |
| 5,539,300 | A | * | 7/1996 | Mathieu | 323/249 |
| 5,612,581 | A | * | 3/1997 | Kageyama | 307/64 |
| 6,037,752 | A | * | 3/2000 | Glennon | 322/22 |
| 2003/0062775 | A1 | * | 4/2003 | Sinha | 307/68 |

FOREIGN PATENT DOCUMENTS

JP 06189469 A * 7/1994

* cited by examiner

*Primary Examiner*—Michael J Sherry
*Assistant Examiner*—Daniel Cavallari
(74) *Attorney, Agent, or Firm*—Ohlandt, Greeley, Ruggiero & Perle, L.L.P.

(57) ABSTRACT

A method and transfer circuit topology for a redundant power converter for switching a load between power conversion circuits in a redundant system. The transfer circuit topology includes a first contactor and a second contactor each having an input coupled to a source and an output coupled to a controlled commutating current path. The controlled commutating current path is coupled to the load for switching between the redundant power converters without interrupting current to the load.

8 Claims, 2 Drawing Sheets

TRANSFER CIRCUIT TOPOLOGY FOR REDUNDANT POWER GENERATOR REGULATORS AND INVERTING DC DRIVES

BACKGROUND OF INVENTION

1. Field of the Invention

The present disclosure relates to transfer circuits. More particularly, the present disclosure relates to a circuit topology and method for switching a load between two power converter circuits without interrupting the current to the load during a transfer between the power converters.

2. Description of the Related Art

Power electronic apparatuses for converting electric power from one form to another are referred to as power converters (or power bridges). The power conversion is accomplished using power semiconductor devices. The power semiconductor devices are used as switches. The power semiconductors may include thyristors (also called SCRs, or silicon controlled rectifiers), triacs, power transistors, power MOSFETs, IGBTs (insulated gate bipolar transistors), IGCTs (integrated gate commutated thyristors), and MCTs (MOS-controlled thyristors). Power converters may be generally classified as AC-DC converters, DC-DC converters, and DC-AC converters (i.e., inverters).

To provide redundancy in power conversion circuits and systems, it is necessary to provide a backup circuit and/or components for at least portions of the power conversion circuit and system. For example, in a power generator regulator and an inverting dc drive using an IGBT power converter to regulate power from a source and provide the regulated power to a load, it is known to provide two of the IGBT power converters. Two IGBT power converters are provided, wherein each of the IGBT power converters provide redundant power conversion functionality for the other IGBT power converter in the instance the other IGBT power converter cannot perform its power conversion functionality.

A problem with many known redundant power conversion systems is that the output load must be reduced to zero before the load can be transferred from one power converter to the other (i.e., redundant) power converter. Consequently, the output load current is interrupted during the transfer between the power converters.

The heretofore solution for switching between the power converters without reducing the load current to zero during the switching thereof required a large and expensive DC contactor. The use of the large DC contactor however may necessitate the use of additional circuitry for protecting the contactor contacts and system wiring from an over-voltage situation. High-voltage arcs inside the contactor are particularly problematic with high-inductance loads.

It is also desirable in a number of applications to switch between the power converters after the on-line power converter has failed, without reducing the load current to zero during the switching.

Another problem with prior, known redundant power conversion systems is the coordination required amongst the two power converters to ensure that, in the instance one of the power converters fails and/or becomes disconnected from the source, the failed and/or disconnected power converter does not remain connected to the load during an invoked switching sequence. This is necessary to prevent the other power converter from feeding energy into the failed converter instead of the load. For example, in a system with a high impedance source, the source current may not be high enough to clear the fuses. Therefore, the difficult task of coordinating the fuse(s) to the source impedance is needed.

Thus, there exists a need for a circuit topology and method for switching the load between two power converter circuits without interrupting the current to the load during the transfer between the power converters of the power converter circuit and system.

SUMMARY OF THE INVENTION

A transfer circuit topology and method is provided for switching the load between two power converter circuits without interrupting the current to the load during the transfer between the power converters.

A transfer circuit topology and method is provided for switching the load between two power converter circuits in the instance one of the power converters fails and/or is inoperable.

A transfer circuit topology and method is provided for switching the load between two power converter circuits in the instance one of the power converters fails and/or is inoperable, without interrupting the current to the load during the transfer between the power converters.

A transfer circuit topology and method is provided for switching the load between two power converter circuits according to the present disclosure.

The transfer circuit topology and method provided for switching the load between two power converter circuits includes a first contactor having an input selectively coupled to a first power converter, a second contactor having an input selectively coupled to a second power converter, and a controlled commutating current path coupled to an output of the first contactor and the second contactor and to a load for providing an uninterrupted load current to the load during a transfer between the first and the second power converters.

BRIEF DESCRIPTION OF THE DRAWINGS

Features of the present detailed description will be understood by reference to the following specification in conjunction with the accompanying drawings, in which like reference characters denote like elements of structure and.

DETAILED DESCRIPTION OF THE INVENTION

Figure 1:
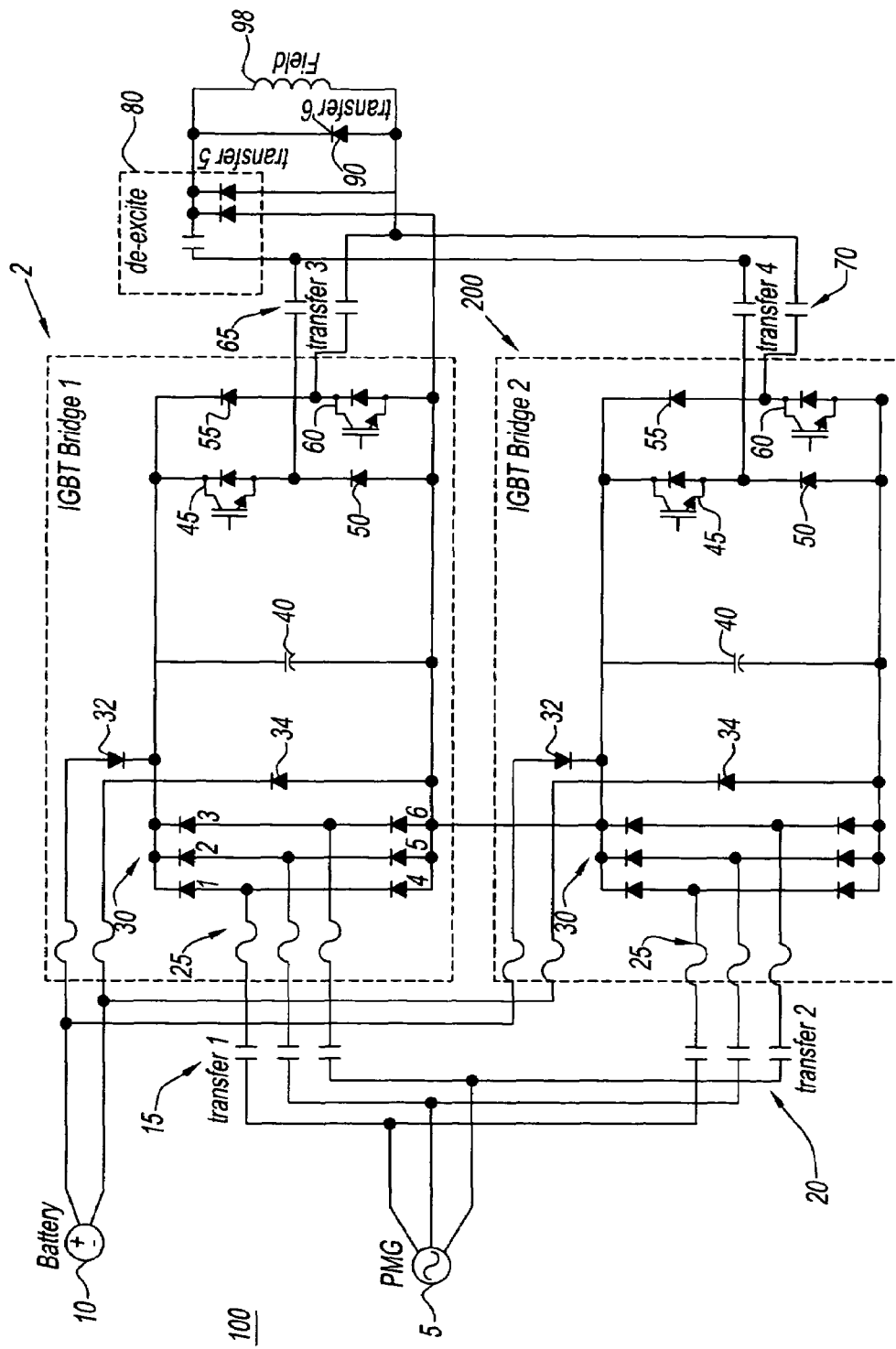
FIG. 1 is a schematic diagram illustrating a circuit topology for switching the load between two power converter circuits without interrupting the current to the load during the transfer between the power converters thereof.

With reference to FIG. 1, there is provided a schematic diagram illustrating a circuit topology for switching the load between two power converter circuits without interrupting the current to the load during the transfer between the power converters, generally represented as reference numeral 100. The power converter 100 has a first power converter 2 and a second power converter 200 coupled to an excitation source 5.

The power converter 1 and power converter 2 are substantially identical circuits. Therefore, as a matter of conciseness and to ease the discussion of same, like elements have the same reference number. It should be noted that the functionality of the circuit topology of the disclosure herein does not require the power converters to be substantially identical. In practice, however, they typically are substantially identical.

Certain aspects of FIG. 1 will be discussed primarily in the context from the perspective of power converter 2. It should be understood that the functionality and responses of power converter 200 follow those of power converter 2 since power converter 2 and power converter 200 are designed and presented as being identical (i.e., redundant) circuits.

In FIG. 1, the excitation source is a permanent magnet generator (PMG) 5 supplying three-phase power to the first power converter 2 and the second power converter 200. Transfer 1 (15) provides three contacts for the three-phase power input power from PMG 5 to power converter 2. Transfer 2 (20) provides three contacts for the three-phase input power from PMG 5 to power converter 200.

While depicted as a three-phase AC power source, the excitation source or power input to power converter 2 and power converter 200 may be a DC power excitation source. Also, the excitation source may be single-phase power. In either case, the circuit topology of the present disclosure can be applicable to single phase and poly-phase AC input sources and DC input sources coming from permanent magnet generators, batteries, standard line power, or any other source of electrical power.

Diodes 32 and 34 are optionally provided for battery 10 input to the two converters for providing voltage across capacitors 40. Batteries are often provided as a backup source of power in the event that the PGM system (or other source of AC power) fails.

Fuses 25; diodes 30, 32, 34, 50, and 55; capacitor 40; and IGBTs 45 and 60 are configured as depicted to form the power converter 2 (200). The details of the operation of power converter 2 should be understood by those skilled in the art and having an understanding of power converters, power regulators, and inverters. As such, a detailed discussion of power converter 2 is not included in the present disclosure.

It is noted that the transistors 45 and 60 may be replaced by IGBTs, MOSFETs, bipolar transistors, and other power semiconductors without departing from the disclosure herein. Again, this aspect of power converter 2 should be appreciated by those having an understanding of power converters, power regulators, and inverters.

Transfer 1 (15) and transfer 2 (20), the contactors coupling the excitation source PMG 5 to power converter 2 and power converter 200, respectively, may be opened and closed to control which of the power converters receives input power for converting and regulating thereof. In one scheme, both transfer 1 (15) and transfer 2 (20) are kept closed, except for when a failure is detected in either power converter 2, 200. In the instance of a failure of one of the power converters, the transfer corresponding to the failed power converter is opened, thereby disconnecting the power converter from the excitation source. Each power converter is thus ready to operate immediately. In this instance, transfer 1 and transfer 2 are two separate contactors.

According to another control scheme, either transfer 1 (15) or transfer 2 (20) are closed at any given time. The particular transfer closed is that transfer supplying power to the operational power converter. Under this scheme, in order to facilitate a fast and reliable transfer between the two power converters, high impedance resistors can be added between the two power converters to keep the capacitor of the unused power converter charged and ready to assume operational functionality. In accord with this scheme, transfer 1 (15) and transfer 2 (20) may be implemented as two separate contactors, or as a single multi-pole contactor having three normally open contacts and three normally closed contacts such that only power converter 2 or power converter 200 is coupled to PMG 5 at any given time.

Transfer 3 (65) is coupled to an output of power converter 2. Transfer 3 has two contacts for coupling the output of power converter 2 to the load. The load is represented by field 98. In an aspect hereof, transfer 3 can be implemented by contacts.

Transfer 4 (70) is coupled to an output of power converter 200. Transfer 4 has two contacts for coupling the output of power converter 200 to the load. In an aspect of the present disclosure, transfer 4 can be implemented by contacts.

The output current is switched between power converter 2 and power converter 200 using transfer 3 (65) and transfer 4 (70). Due to a potential for a short circuit due to a failed power converter, either transfer 3 or transfer 4 are closed at any given time. That is, transfer 3 and transfer 4 are not both closed (and conducting current) at the same time. Transfer 3 and transfer 4 may be implemented as two separate contactors.

Transfer 3 and transfer 4 may be implemented as a single multi-pole device using "break-before-make" contacts so as to maintain the isolation between the output of power converter 2 and the output of power converter 200.

Due to the usually high inductance nature of the load, transfer 6, i.e., thyristor 90, across the load and the output of transfer 3 (65) and transfer 4 (70) is turned on for carrying the load current during the transition period when both transfer 3 and transfer 4 are open simultaneously. During the break portion of the break-before-make switching operation of transfer 3 (65) and transfer 4 (70) there is a relatively brief time period wherein neither transfer 3 or transfer 4 is closed. Accordingly, the need to reduce the load current to zero in order to transfer between the two power converters is obviated.

In an aspect of the present disclosure, a de-excitation circuit 80 is provided to provide a reliable backup, shutdown circuit in the event of a failure of one or both of the power converters. The diodes of de-excitation circuit 80 operate to dissipate stored energy of the, for example, generator field (98) inductance. The de-excitation circuit 80 is not a requirement for the operation and switching between the two power converters disclosed herein.

Also, the particular implementation of de-excitation circuit 80 may vary without departing from the scope of the present disclosure. For example, a thyristor and/or other power semiconductors may be used to implement de-excitation circuit 80.

Further safeguards against the instance of a failure of one or both of the power converters may be accomplished by including a separate input power disconnect in series with either one or both of the inputs to the power converters. Under normal operational conditions, the added disconnects are closed and do not impact the operation of the power converter circuit. In the instance of a failure of one or both of the power converters, the included disconnected can be used to disconnect the source power from the power converters.

Figure 2:
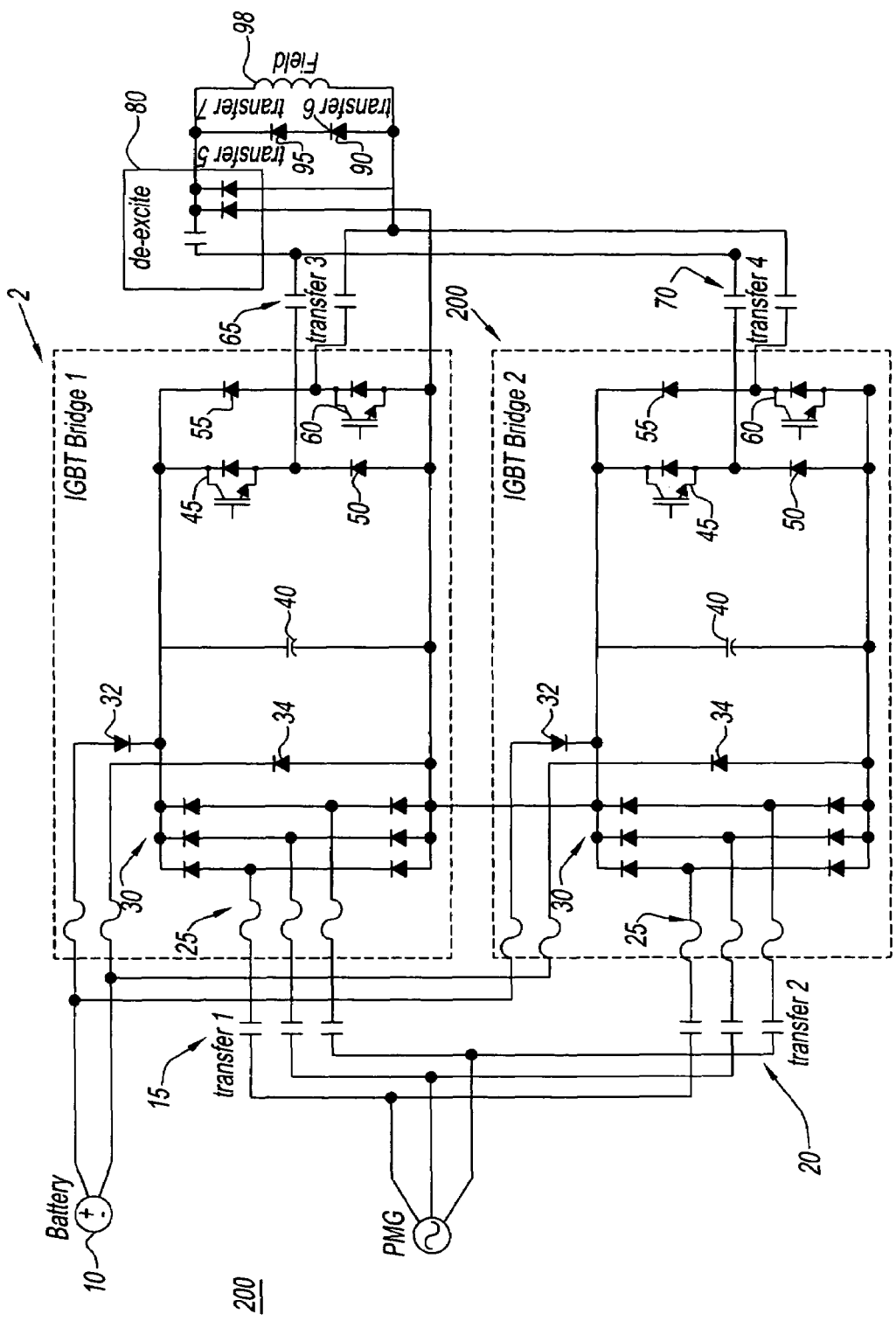
FIG. 2 is a schematic diagram illustrating a circuit topology for switching the load between two power converter circuits without interrupting the current to the load during the transfer between the power converters, including a diode in the controlled commutating current path coupled the load.

Referring to FIG. 2, there is shown a schematic diagram substantially the same as FIG. 1. FIG. 2 includes a transfer 7 (95), an added diode in series with the SCR of transfer 7. The additional diode, i.e., transfer 7 (95) provides for the continued operation of circuit 200 in the instance that transfer 6 fails (i.e., shorts). In the instance transfer 6 shorts, it is not possible to control the commutation of the load current therethrough. However, transfer 7 will provided limited operation. Transfer 7 (95) may be a fast recovery type diode, thereby providing a more compatible "fit" with the fast switching capabilities of the IGBTs. Accordingly, SCR, transfer 6 (90), may be a slower operating characteristic component.

The present disclosure having been thus described with particular reference to the preferred forms thereof, it will be obvious that various changes and modifications may be made therein without departing from the spirit and scope of the present disclosure as recited in the claims.

What is claimed is:

1. A transfer circuit topology comprising:
   a first contactor having an input selectively coupled to a first power converter;
   a second contactor having an input selectively coupled to a second power converter;
   a single battery coupled to a first input of said first power converter using first diodes and a second input of said second power converter using second diodes;
   a controlled commutating current path coupled to an output of said first contactor and said second contactor and to a load for providing an uninterrupted load current from said single battery to said load during a transfer between said first and said second power converters; and
   a thyristor across said load and said output of said first and second contactors, said thyristor being turned on for carrying said uninterrupted load current during a transition period when both said first and second contactors are open simultaneously.

2. The transfer circuit topology of claim 1, wherein said first and said second contactors comprise a pair of contactors.

3. The transfer circuit topology of claim 1, wherein said first contactor and said second contactor are separate contactors.

4. The transfer circuit topology of claim 1, wherein said first contactor and said second contactor comprise a single multi-pole contactor.

5. The transfer circuit topology of claim 4, wherein said single multi-pole contactor comprises a break-before-make type contactor.

6. The transfer circuit topology of claim 1, wherein said first power converter has a first capacitor and said second power converter has a second capacitor, said single battery being coupled to an input of said first power converter and said second power converter using diodes, said diodes providing voltage across said first and second capacitors from said single battery.

7. The transfer circuit topology of claim 1, wherein said third contactor and said fourth contactor comprise a single multi-pole contactor.

8. The transfer circuit topology of claim 7, wherein said single multi-pole contactor comprises a break-before-make type contactor.

* * * * *